United States Patent
Kawakami (10) Patent No.: US 8,515,408 B2
(45) Date of Patent: Aug. 20, 2013

(54) MOBILE COMMUNICATION TERMINAL AND METHOD FOR NAVIGATING SERIES OF OPERATIONS OF THE MOBILE COMMUNICATION TERMINAL

(75) Inventor: Munenori Kawakami, Tokyo (JP)

(73) Assignee: Fujitsu Mobile Communications Limited, Kawasaki (JP)

(*) Notice: Subject to any disclaimer, the term of this patent is extended or adjusted under 35 U.S.C. 154(b) by 518 days.

(21) Appl. No.: 12/765,139

(22) Filed: Apr. 22, 2010

(65) Prior Publication Data

US 2010/0291970 A1 Nov. 18, 2010

(30) Foreign Application Priority Data

May 14, 2009 (JP) ................ P2009-117688

(51) Int. Cl.
*H04M 3/00* (2006.01)
(52) U.S. Cl.
USPC ............. 455/418; 455/557; 345/2.1; 345/156
(58) Field of Classification Search
USPC .................... 455/3.06, 11.1, 41.1, 41.2, 41.3, 455/66.1, 418–420, 550.1, 556.1, 556.2, 455/557, 566; 345/1.1, 2.1, 2.2, 2.3, 156, 345/169; 348/14.01–14.05, 14.07, 14.08, 348/211.1, 211.2, 333.01; 381/306
See application file for complete search history.

(56) References Cited

U.S. PATENT DOCUMENTS

| | | | |
|---|---|---|---|
| 6,915,143 B2 * | 7/2005 | Kashu et al. | 455/560 |
| 7,966,044 B2 * | 6/2011 | Hashimoto et al. | 455/566 |
| 2007/0271525 A1 * | 11/2007 | Han et al. | 715/786 |
| 2010/0220250 A1 * | 9/2010 | Vanderwall et al. | 348/837 |

FOREIGN PATENT DOCUMENTS

| | | |
|---|---|---|
| JP | 2001-166867 A | 6/2001 |
| JP | 2004-134942 A | 4/2004 |
| JP | 2006-085306 A | 3/2006 |
| JP | 2006-243917 A | 9/2006 |

OTHER PUBLICATIONS

JP Office Action mailed on Jul. 24, 2012 as received in application No. 2009-117688.
JP Office Action mailed on Apr. 23, 2013 in application No. 2009-117688.

* cited by examiner

*Primary Examiner* — Vladimir Magloire
(74) *Attorney, Agent, or Firm* — Maschoff Brennan (57) ABSTRACT

A mobile communication terminal adapted for being connected to an external display device through a wired or wireless link is provided. The mobile communication terminal has an input section which receives an input for operating the mobile communication terminal, a storage section which stores a manual of the mobile communication terminal, the manual including a procedure for an operation performed through the input section, an external output controller which provides the external display device with the manual so as to display the manual on the external display device, and a navigation section which introduces a series of operations to be input through the input section in accordance with the procedure displayed on the external display device.

12 Claims, 6 Drawing Sheets

MOBILE COMMUNICATION TERMINAL AND METHOD FOR NAVIGATING SERIES OF OPERATIONS OF THE MOBILE COMMUNICATION TERMINAL

CROSS REFERENCE TO RELATED APPLICATIONS

This application is based upon and claims the benefit of priority from the prior Japanese Patent Application No. 2009-117688 filed on May 14, 2009;
the entire contents of which are incorporated herein by reference.

BACKGROUND

1. Field

The present invention relates to a mobile communication terminal provided with a function for outputting data relating to a user's manual to the outside.

2. Description of the Related Art

A mobile communication terminal provided with various functions in addition to a voice communication function is known these days, such as functions for sending and receiving emails, viewing a digital TV program, browsing websites and playing music. As the mobile communication terminal has multiple functions, a user needs too many operation methods for him or her to comprehend, and in some cases the user has to bother consulting a user's manual every time he or she uses one of the functions.

It is known that a user's manual indicating a simple operation procedure of some mobile communication terminal is stored in the mobile communication terminal so that such a problem is dealt with. The mobile communication terminal displays the user's manual on its display as necessary, so that a user can easily consult the user's manual. The display of the mobile communication terminal such as a mobile phone, however, is small in size in most cases, and it is difficult to display a user's manual indicating a detailed operation procedure on the small-sized display.

Meanwhile, an art related to a user's manual displaying device which outputs a user's manual to the outside and displays the user's manual on an external display device is ordinarily known, e.g., as disclosed in Japanese Patent Publication of Unexamined Applications (Kokai), No. 2001-166867.

According to JP-A-2001-166867, the user's manual displaying device displays the user's manual on a larger display than a display provided to the user's manual displaying device, so as to intelligibly display the user's manual of the user's manual displaying device. According to the art disclosed in JP-A-2001-166867, however, the user's manual displaying device merely outputs the user's manual to the external display device so as to visually provide the user with the manual. Thus, only a display of a detailed manual cannot sufficiently support a user who is unable to understand an operation procedure only by consulting the user's manual, and is not kind enough for such a user.

DETAILED DESCRIPTION

Accordingly, an advantage of the present invention is to provide a mobile communication terminal adapted for being connected to an external display device through a wired or wireless link. The mobile communication terminal has an input section which receives an input for operating the mobile communication terminal, a storage section which stores a manual of the mobile communication terminal, the manual including a procedure for an operation performed through the input section, an external output controller which provides the external display device with the manual so as to display the manual on the external display device, and a navigation section which introduces a series of operations to be input through the input section in accordance with the procedure displayed on the external display device.

An embodiment of the present invention will be explained on the basis of the drawings, as follows.

Figure 1A:
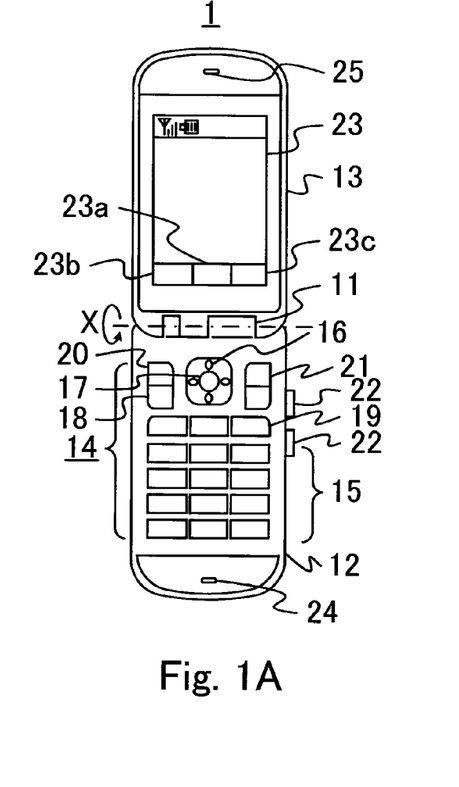
FIGS. 1A and 1B show external views of a mobile phone of a flip structure, i.e., an example of a mobile communication terminal of the present invention.
Figure 1B:
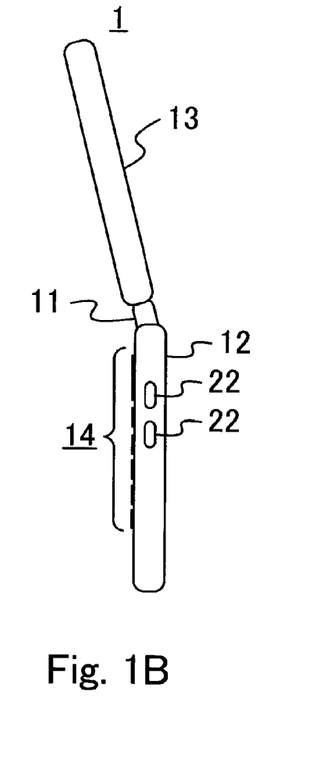

FIGS. 1A and 1B show external views of a mobile phone 1 of a flip structure, i.e., an example of a mobile communication terminal of the present invention. FIG. 1A shows a front view of the structure of the mobile phone 1 in an approximately 180 degree open state. FIG. 1B shows a side view of the structure of the mobile phone 1 in the open state.

As shown in FIGS. 1A and 1B, the mobile phone 1 has a first housing section 12 and a second housing section 13 which are hinge-coupled with each other on both sides of a middle-positioned hinge section 11. The mobile phone 1 is configured to be folded around the hinge section 11 in an X-direction indicated by an arrow. The mobile phone 1 is provided with a built-in antenna for transmitting and receiving radio waves (antenna 38 shown in FIG. 3 described later) at an internal certain position, and transmits and receives radio waves to and from a base station (not shown) through the built-in antenna.

The first housing section 12 is provided with operation keys 14 on a face. The operation keys 14 are constituted by numeric keys 15 to be used for entering numerals "0-9", alphabets "A-Z" and Japanese syllabary letters, a 4-way navigation key 16 including up, down, leftward and rightward keys, a selection key 17, an email key 18, a power key 19, a left soft key 20, a right soft key 21, etc.

Operate the 4-way navigation key 16 up, down, leftwards and rightwards, so as to move a cursor, etc. displayed on a main display 23 up, down, leftwards and rightwards. Further, press the selection key 17 so as to make selection of various processes. A process displayed in a selection key function displaying area 23a provided on a lower portion of the main display 23 is assigned to the selection key 17.

Further, the first housing section 12 is provided above the 4-way navigation key 16 and the selection key 17 with the left soft key 20 and the right soft key 21. The first housing section 12 is provided on a side with side keys 22 to be used for operating the mobile phone 1. The left soft key 20, the right soft key 21 and the side keys 22 can be pressed inwards on the first housing section 12, so that functions assigned to those keys are individually performed. In particular, processes displayed in a left soft key function displaying area 23b and a right soft key function displaying area 23c provided on the lower portion of the main display 23 are assigned to the left soft key 20 and the right soft key 21, respectively. A process for displaying a menu screen for use of an email function is assigned to the email key 18. A user presses the email key 18 so as to open the menu screen for use of the email function.

The first housing section 12 is provided below the operation keys 14 with a microphone 24. The mobile phone 1 collects a user's voice during a call by means of the microphone 24.

Incidentally, the first housing section 12 is equipped on a back with a battery that is not shown. If the power key 19 is pressed and the mobile phone 1 is powered on, each of circuit portions of the mobile phone 1 is supplied with power from the battery so as to be ready to work.

Meanwhile, the second housing section 13 is provided with a main display 23 which occupies most of an area of the second housing section 13. Symbols indicating a state of receiving an electromagnetic wave and remaining battery power, content of an email, content on a website, etc. are displayed on the main display 23. Incidentally, the main display 23 is formed, e.g., by an LCD (Liquid Crystal Display) or an organic EL (ElectroLuminescence) display device.

The second housing section 13 is provided at a certain position above the main display 23 with a receiver 25 which enables the user's phone call. Incidentally, the mobile phone 1 is provided at a certain position with a speaker (speaker 39 shown in FIG. 3) that is a voice output unit other than the receiver 25.

Figure 2A:
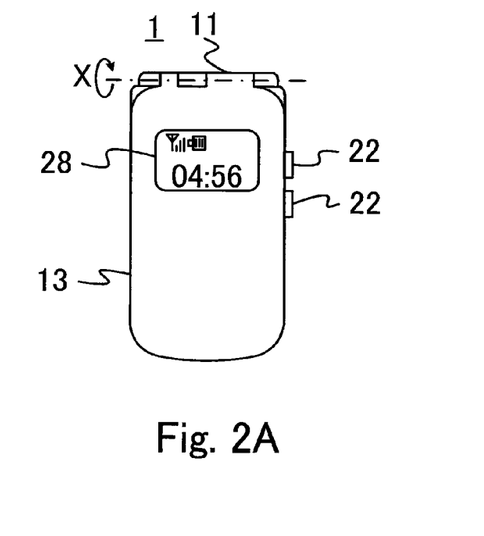
FIGS. 2A and 2B show other external views of the mobile phone of the flip structure, i.e., an example of a mobile communication terminal of the present invention.
Figure 2B:
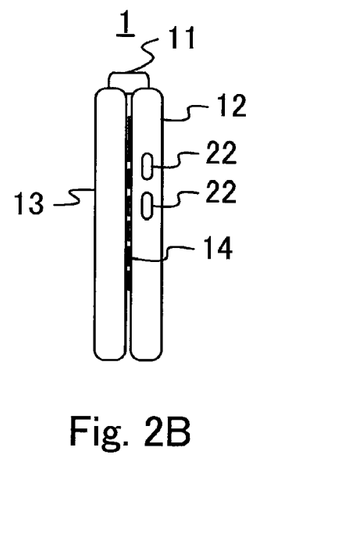

FIGS. 2A and 2B show other external views of the mobile phone 1 of the flip structure which is an example of a mobile communication terminal of the present invention. The mobile phone 1 shown in FIGS. 2A and 2B is in a closed state after the second housing section 13 rotates with respect to the first housing section 12 in the X-direction indicated by the arrow shown in FIG. 1A. FIG. 2A shows a front view of the structure of the mobile phone 1 in the closed state. FIG. 1B shows a side view of the structure of the mobile phone 1 in the closed state.

The second housing section 13 is provided with a sub-display 28 formed, e.g., by an LCD. A signal strength indicator which shows current strength of an incoming signal, a battery indicator which shows currently remaining battery power, the present time, etc. are displayed on the sub-display 28.

Figure 3:
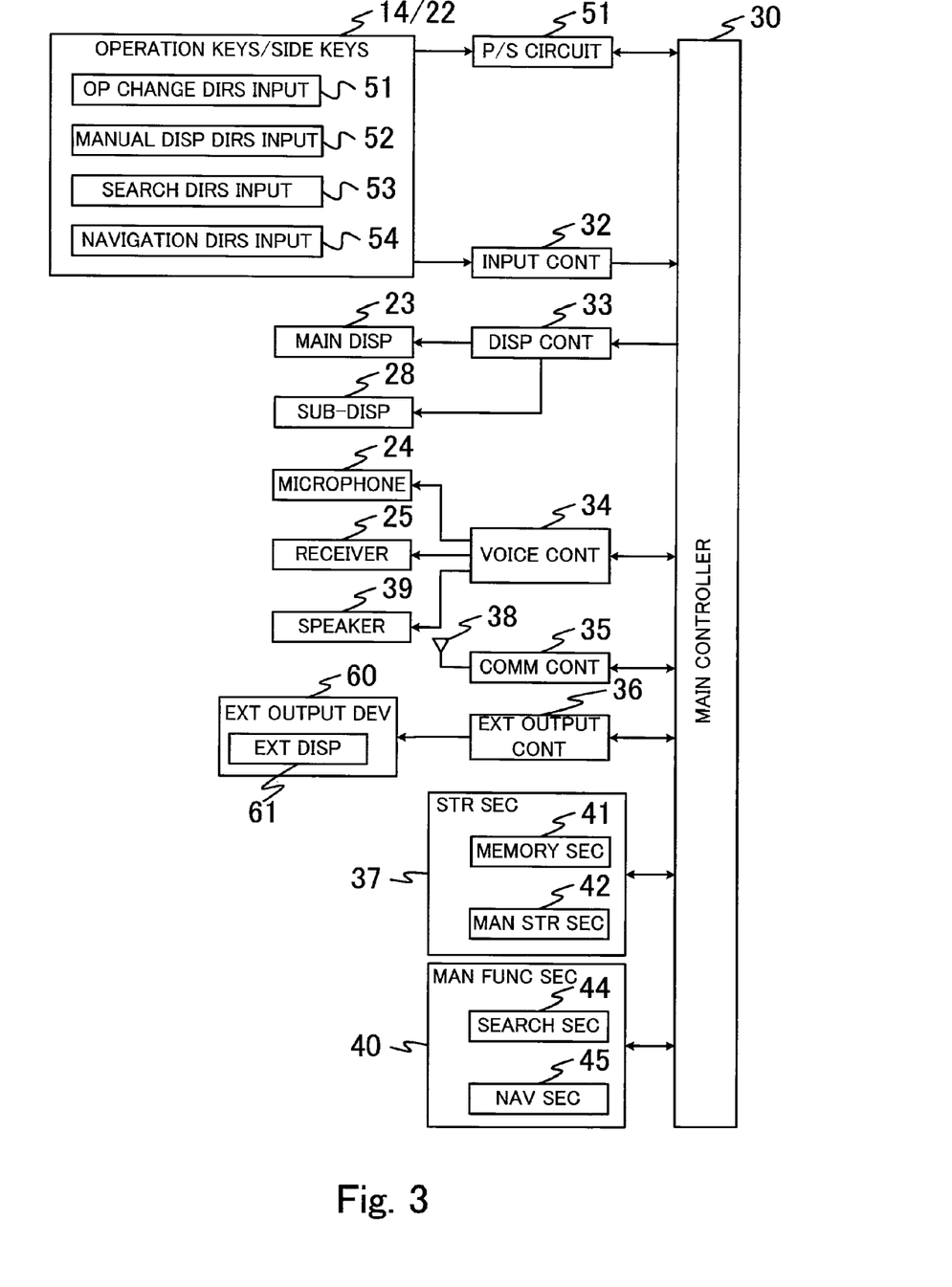
FIG. 3 is a schematic block diagram which shows a functional configuration of the mobile phone of the embodiment.

FIG. 3 is a schematic block diagram which shows a functional configuration of the mobile phone 1 of the embodiment. The mobile phone 1 is constituted by a main controller 30, a power supply circuit 31, an input controller 32, a display controller 33, a voice controller 34, a communication controller 35, an external output controller 36, a storage section 37 and a manual function section 40 which are connected to one another through a bus for mutual communication.

The main controller 30 has a CPU (Central Processing Unit), works on the basis of various programs stored in the storage section 37, and wholly controls the mobile phone 1. The power supply circuit 31 has an input interface to the power key 19 of the operation keys 14. Upon sensing the power key 19 as being pressed by a user, the power supply circuit 31 produces a signal indicating that the power key 19 has been pressed and provides the main controller 30 with the signal. Further, the power supply circuit 31 has a power source (battery), switches between powered-on and powered-off states of the mobile phone 1 on the basis of an input through the power key 19, and supplies each of the portions with power from the power source in the powered-on state so as to make the mobile phone 1 ready to work.

The input controller 32 has an input interface to the operation keys 14 and the side keys 22. Upon sensing one of the operation keys 14 and the side keys 22 as being pressed, the input controller 32 produces a signal which indicates the pressed key and provides the main controller 30 with the signal.

Further, the operation keys 14 and the side keys 22 function as an operation change directions input 51, a manual display directions input 52, a search directions input 53 and a navigation directions input 54 for performing a manual display function and a navigation function. In particular, the operation change directions input 51 receives directions for changing an object to be operated by means of the operation keys 14, etc. from the main display 23 of the mobile phone 1 to an external display 61 of an external output device 60 or vice versa.

The display controller 33 has a display interface to the main display 23 and the sub-display 28. The display controller 33 displays text data, image data, etc. on the main display 23 and the sub-display 28 as controlled by the main controller 30. The display controller 33 makes the display on the main display 23 and the display on the sub-display 28 effective or ineffective as controlled by the main controller 30.

The voice controller 34 produces an analog voice signal from the voice collected by the microphone 24 and converts the analog voice signal into a digital voice signal, as controlled by the main controller 30. Further, upon being provided with a digital voice signal, the voice controller 34 converts the digital voice signal into an analog voice signal and produces voice from the receiver 25 accordingly.

The communication controller 35 performs a despreading process on a spread-spectrum signal received from a base station through the antenna 38 as controlled by the main controller 30 so as to retrieve data. The data is provided to the voice controller 34 so as to be output from the receiver 25, provided to the display controller 33 so as to be displayed on the main display 23, or recorded in the storage section 37 as directed by the main controller 30. Further, upon being provided with voice data collected by the microphone 24, data entered through the operation keys 14 or data stored in the storage section 37, the communication controller 35 performs a spread spectrum process on those data so as to send a spread spectrum signal through the antenna 38 to the base station as controlled by the main controller 30.

The external output controller 36 outputs a user's manual stored in the mobile phone 1 and functions as a means for controlling an external output which displays the user's manual on the external display 61 of the external output device 60 connected with the mobile phone 1 through a wired or wireless link. If, e.g., the mobile phone 1 is connected with the external output device 60 and the manual display directions input 52 receives directions for displaying the user's manual, the external output controller 36 provides the external display 61 with the user's manual.

The external output device 60 is a device provided with the display 61 (external display 61) that is larger in size and configured to provide a greater amount of information than the main display 23 provided to the mobile phone 1, and a TV or a personal computer, e.g., can be employed as the external output device 60.

The storage section 37 is constituted by a ROM (Read Only Memory) or a hard disk that stores a program of a process or data required for the process, a non-volatile memory, a database, a RAM (Random Access Memory) in which the main controller 30 temporarily saves data to be used for performing the process, etc. In particular, the mobile phone 1 of the embodiment has a memory section 41 and a manual storage section 42 which function for performing the manual display function.

The memory section 41 temporarily keeps information which the mobile phone 1 needs for performing the manual display function. To put it specifically, if the object to be operated by means of the operation keys 14, etc. changes from screen data displayed on the main display 23 to the user's manual displayed on the external display 61 or vice versa, operation information of one of the displays 23 and 61 which was operated before the change is temporarily saved in the memory section 41. The manual storage section 42 functions as a means for storing the user's manual which indicates a procedure for operating the operation keys 14, etc. of the mobile phone 1.

The manual function section 40 performs the manual display function and the navigation function which will be described later on the basis of the process of the main controller 30. The manual function section 40 has a search section 44 and a navigation section 45.

The search section 44 performs a search function for searching the user's manual for a search matter specified by a user by means of the search directions input 53 such as the operation keys 14. The navigation section 45 performs the navigation function if the navigation directions input 54 receives directions for performing the navigation function. To put it specifically, the navigation section 45 performs a certain process so as to guide a user through an operation necessary to perform a certain function provided to the mobile phone 1.

As described above, the user's manual which indicates a procedure for operating the mobile phone 1 is stored in the manual storage section 42 of the storage section 37 that is a storage area of the mobile phone 1. As being provided with the external output controller 36, the mobile phone 1 can implement the manual display function for displaying the user's manual on the external display 61 of the external output device 60.

Moreover, the mobile phone 1 is characterized by being provided with the navigation function for guiding a user through a procedure shown in the user's manual displayed on the external display 61 to an operation for performing a certain function by using input means such as the operation keys 14 and the side keys 22 (the operation keys 14, etc.). The manual display function and the navigation function will be specifically explained below.

Figure 4:
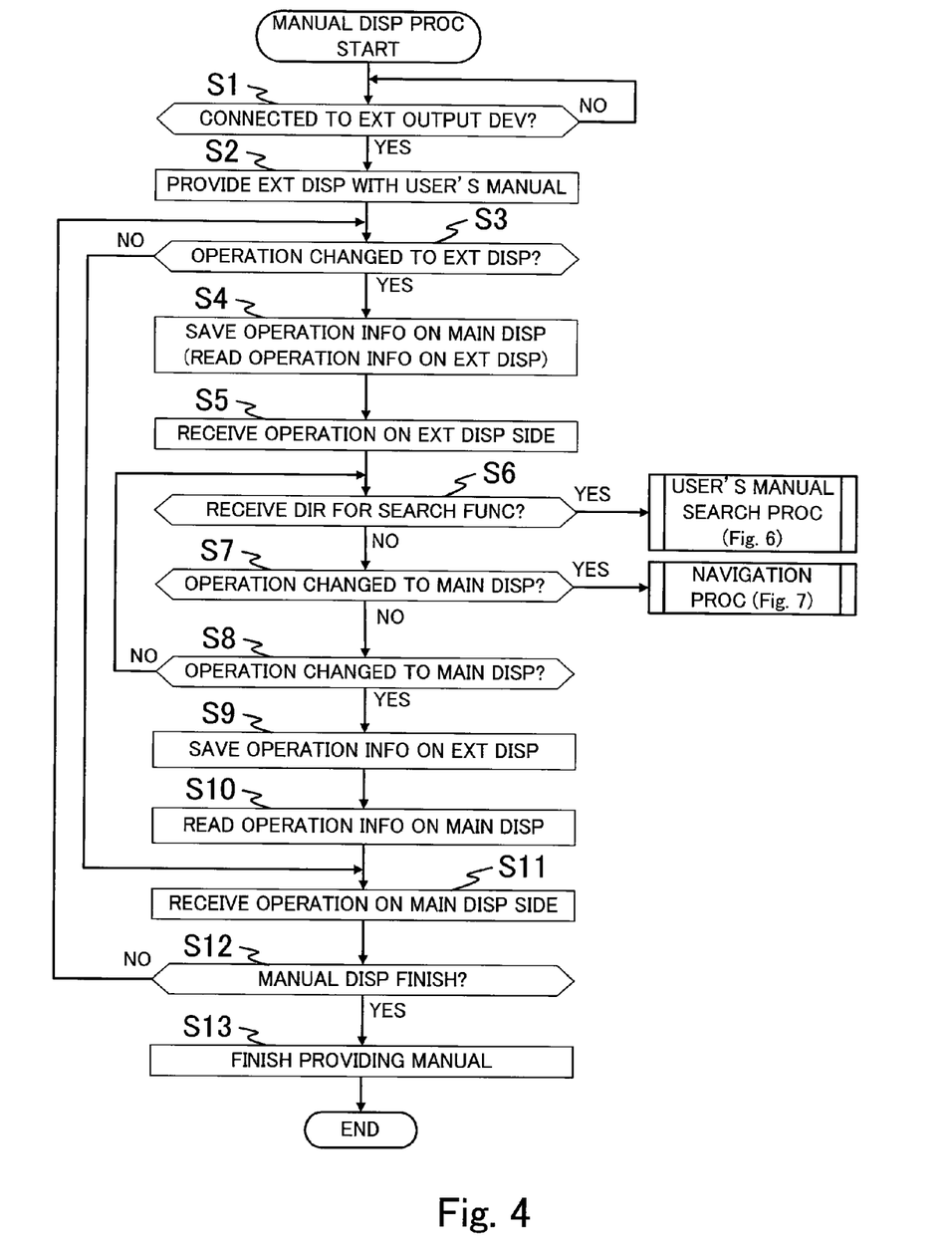
FIG. 4 shows a flowchart for explaining a manual display process performed by the mobile phone of the embodiment.

FIG. 4 shows a flowchart for explaining a manual display process performed by the mobile phone 1 of the embodiment.

The main controller 30 identifies whether the external output controller 36 has started a connection with the external output device 60 at a step S1. Upon identifying the external output device 60 as not being connected ("NO" of the step S1), the main controller 30 waits to start a process until the connection is made.

Meanwhile, upon identifying a start of the connection with the external output device 60 ("YES" of the step S1), the main controller 30 provides the external display 61 of the external output device 60 through the external output controller 36 with the user's manual stored in the manual storage section 42 at a step S2. Incidentally, the main controller 30 can output the user's manual as soon as the start of the connection with the external output device 60, and can output the user's manual upon receiving directions for displaying the user's manual from the manual display directions input 52.

Figure 5A:
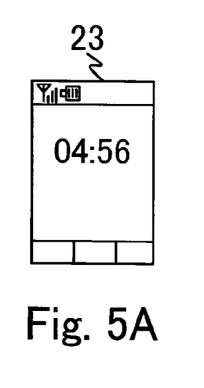
FIGS. 5A and 5B show display examples on respective displays in a case where a manual providing step S2 is carried out in a manual display process.
Figure 5B:
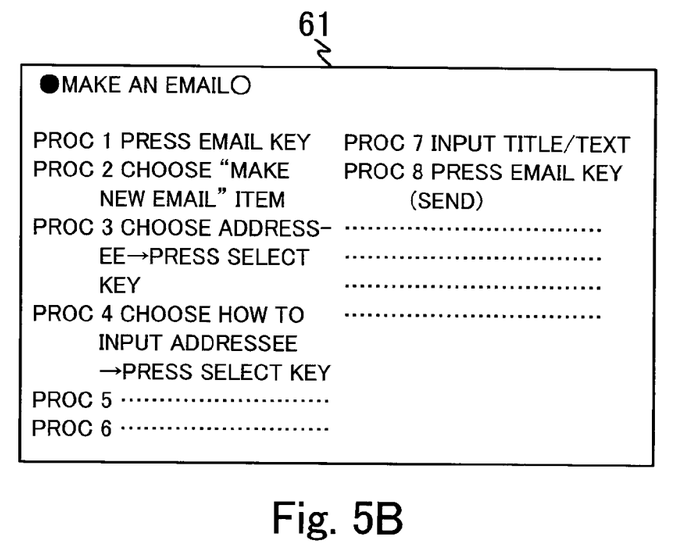

FIGS. 5A and 5B show examples displayed on the respective displays in a case where the manual output step S2 for outputting the user's manual in the manual display process is carried out.

The main display 23 of the mobile phone 1 continuously displays a screen displayed before the start of the connection with the external output device 60. If the connection with the external output device 60 is started while a home screen is displayed, the home screen is continuously displayed on the main display 23, e.g., as shown in FIG. 5A. Then, as shown in FIG. 5B, certain items of the user's manual are displayed on the external display 61. Incidentally, items indicating a procedure for making a new email are displayed as an example in FIG. 5B.

The main controller 30 identifies at a step S3 whether the main controller 30 has received directions from the operation change directions input 51 for changing the object to be operated by means of the operation keys 14, etc. to the external display 61. After the object to be operated is changed to the external display 61, functions displayed on the external display 61 are operated by means of the operation keys 14, etc. of the mobile phone 1. Upon identifying that the main controller 30 has not received the directions for changing the object to be operated to the external display 61 and that the object to be operated remains the main display 23 of the mobile phone 1 ("NO" of the step S3), the process moves forward to a step S11. In this case, the mobile phone 1 performs an ordinary process on the side of the main display 23 on the basis of inputs received from the operation keys 14, etc.

Meanwhile, upon identifying that the main controller 30 has received the directions for changing the object to be operated to the external display 61 ("YES" of the step S3), the main controller 30 saves present operation information on the main display 23 of the mobile phone 1 in the memory section 41 at a step S4. The operation information saved at this time relates to a present state of an operation being performed on the mobile phone 1. If some process (e.g., for making a new email) is being performed, information relating to an operation performed during the process is saved. The operation information is saved so that, if the object to be operated is changed to the main display 23 of the mobile phone 1 again, an interrupted process can be resumed.

The main controller 30 changes the object to be operated at a step S5, so as to receive an operation entered by means of the operation keys 14, etc. as an operation on the external display 61 on which the user's manual is displayed. The main controller 30 receives an operation entered through the operation keys 14, etc. as a certain operation which can be performed on the user's manual such as scrolling the user's manual or jumping to a desired page. Incidentally, if the external display 61 is the object to be operated, the main display 23 of the mobile phone 1 does not change a display in particular, and keeps the display immediately before the object to be operated is changed to the user's manual side.

The main controller 30 identifies at a step S6 whether the main controller 30 has received directions through the search directions input 53 for performing a search function for searching the user's manual. Upon identifying that the main controller 30 has received the directions for performing the search function ("YES" of the step S6), the process moves forward to a user's manual search process performed by the search section 44. The user's manual search process will be described later with reference to FIG. 6.

Meanwhile, upon identifying that the main controller 30 has not received the directions for performing the search function ("NO" of the step S6), the main controller 30 identifies at a step S7 whether the main controller 30 has received directions through the navigation directions input 54 for performing the navigation function for guiding a user through a procedure shown in the user's manual to an operation. Upon identifying that the main controller 30 has received the directions for performing the navigation function ("YES" of the step S7), the process moves forward to a navigation process performed by the navigation section 45. The navigation process will be described later with reference to FIG. 7.

The main controller 30 identifies at a step S8 whether the main controller 30 has received directions from the operation change directions input 51 for changing the object to be operated by means of the operation keys 14, etc. to the main display 23 of the mobile phone 1. Upon identifying that the main controller 30 have not received the directions for changing the object to be operated to the main display 23 and that the object to be operated remains the external display 61 ("NO" of the step S8), the process returns to the search performing directions identifying step S6, and the following steps are repeated. Incidentally, if the user's manual is displayed on the external display 61 and neither the search function nor the navigation function is performed, the object to be operated by means of an input entered through the operation keys 14 is the external display 61, and the operation for scrolling the user's manual described above, etc. is performed.

Meanwhile, upon identifying that the main controller 30 have received the directions for changing the object to be operated to the main display 23 of the mobile phone 1 ("YES" of the step S8), the main controller 30 saves present operation information on the user's manual on the external display 61 in the memory section 41 at a step S9. The operation information saved at this time relates to a present state of an operation being performed on the user's manual on the external display 61. If some process (e.g., for scrolling the user's manual) is performed, information relating to an operation performed during the process is saved. The operation information is saved so that, if the object to be operated is changed to the main display 23 of the external display 61 again, an interrupted process can be resumed.

The main controller 30 reads from the memory section 41 at a step S10 the operation information on the main display 23 of the mobile phone 1 saved at the operation information saving step S4. The main controller 30 changes the object to be operated at a step S11 so as to receive an operation entered by means of the operation keys 14, etc. as an operation on the main display 23. The process interrupted as the object to be operated was changed at the operation change identifying step S3 is resumed on the main display 23.

The main controller 30 identifies at a step S12 whether the main controller 30 has received directions through the manual display directions input 52 for finishing displaying the user's manual on the external display 61. Upon identifying that the main controller 30 has not received the directions for finishing displaying the user's manual ("NO" of the step S12), the process returns to the operation change identifying step S3, and the following steps are repeated.

If the object to be operated is changed to the external display 61 again at the operation change identifying step S3, the operation information on the main display 23 is saved and the operation information on the external display 61 saved at the operation information saving step S9 is read at the same time at the step S4. The process interrupted as the object to be operated was changed at the operation change identifying step S8 is resumed on the external display 61.

Meanwhile, upon identifying that the main controller 30 has received the directions for finishing displaying the user's manual ("YES" of the step S12), the main controller 30 finishes providing the external display 61 with the user's manual and finishes the manual display process at a step S13.

Then, the user's manual search process performed in a case where the main controller 30 has received the directions for performing a search process in the user's manual at the search performing identifying step S6 in the manual display process shown in FIG. 4 ("YES" of the step S6) will be explained.

Figure 6:
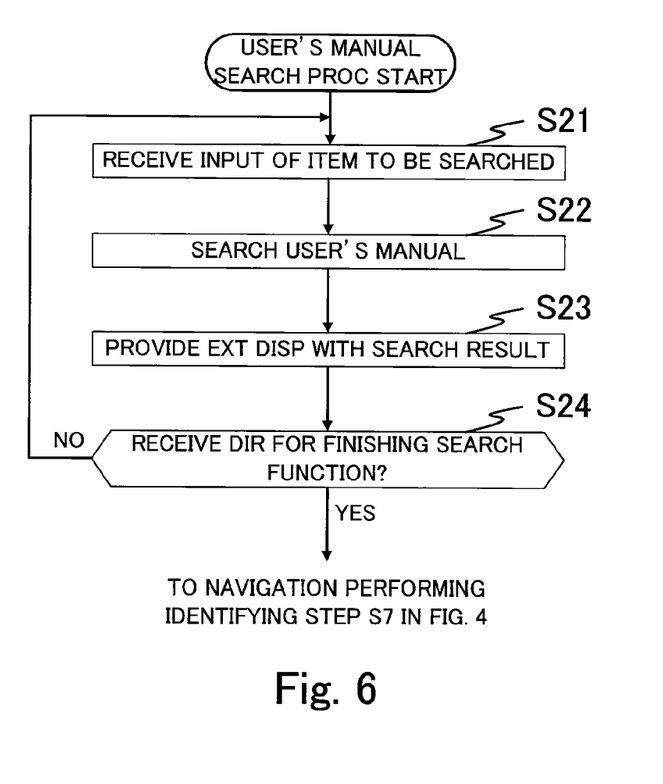
FIG. 6 shows a flowchart for explaining a user's manual search process performed by a search section of the mobile phone of the embodiment.

FIG. 6 shows a flowchart for explaining the user's manual search process performed by the search section 44 (main controller 30) of the mobile phone 1 of the embodiment.

The search section 44 receives an input of a search matter to be searched for in the user's manual at a step S21. The search matter is input through the numeric keys 15 of the operation keys 14. The search section 44 searches the user's manual at a step S22 on the basis of the search matter whose input has been received.

The search section 44 provides the external display 61 at a step S23 with a search result that has been searched for in the user's manual. A portion of the user's manual corresponding to the search result is displayed on the external display 61.

The search section 44 identifies at a step S24 whether the search section 44 has received directions from the search directions input 53 for finishing the search function. If the search section 44 identifies that the search section 44 has not received the directions for finishing the search function ("NO" of the step S 24), the process returns to the search matter receiving step 21, and the following steps are repeated. Meanwhile, upon identifying that the search section 44 has received the directions for finishing the search function ("YES" of the step S 24), the search section 44 finishes the user7s manual search process, and the process moves forward to the navigation performing identifying step S7 in the manual display process shown in FIG. 4.

Then, the navigation process performed in a case where the main controller 30 has received the directions for performing the navigation function at the navigation performing identifying step S7 in the manual display process shown in FIG. 4 will be explained.

Figure 7:
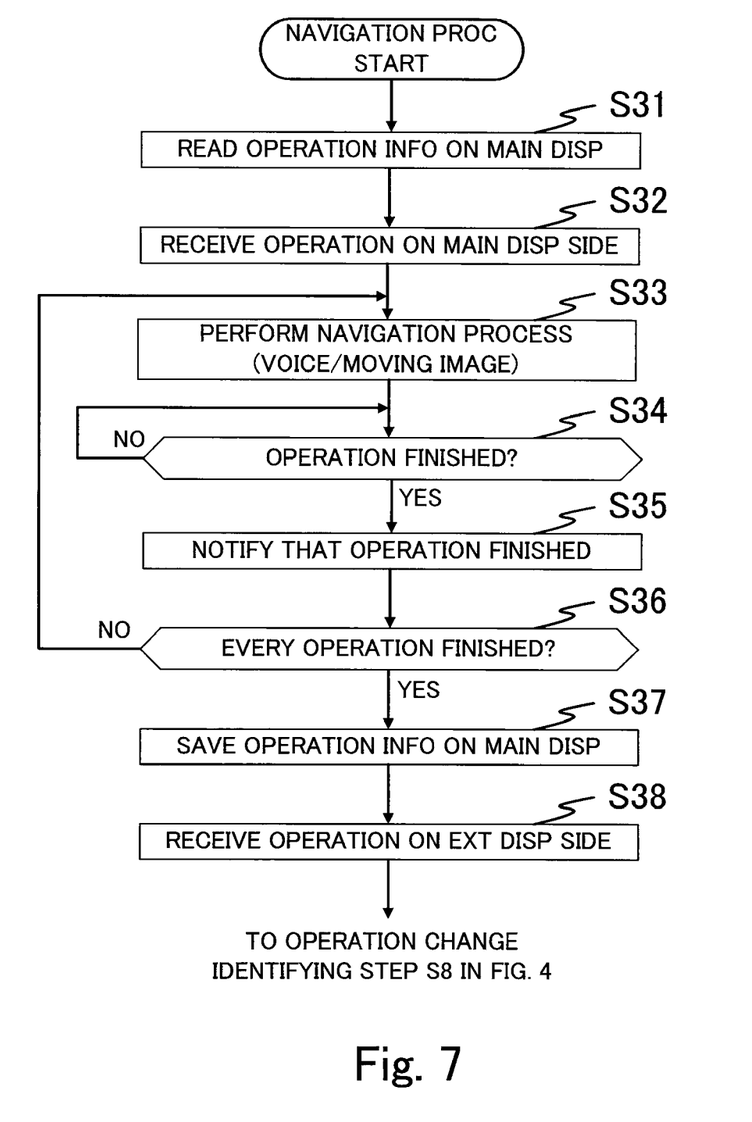
FIG. 7 shows a flowchart of a process for explaining a navigation process performed by a navigation section of the mobile phone of the embodiment.

FIG. 7 shows a flowchart for explaining the navigation process performed by the navigation section 45 (main controller 30) of the mobile phone 1 of the embodiment.

The navigation section 45 reads from the memory section 41 at a step S31 the operation information on the main display 23 of the mobile phone 1 saved at the operation information saving step S4 in the manual display process shown in FIG. 4.

The navigation section 45 changes the object to be operated at a step S32, so as to receive an operation entered by means of the operation keys 14, etc. as an operation on the main display 23. The process interrupted as the object to be operated was changed at the operation change identifying step S3 shown in FIG. 4 is resumed on the main display 23.

The navigation section 45 performs a certain navigation process at a step S 33, so as to guide a user to an operation that the user needs for performing a certain function provided to the mobile phone 1. To put it specifically, the navigation section 45 starts to provide the external display 61 with moving image or voice data corresponding to a procedure for performing the certain function shown in the user's manual. A replay of the provided moving image or voice data is started on the external display 61. The moving image or voice data provided to the external display 61 is stored, e.g., in the manual storage section 42 in relation to the manual displayed on the external display 61. The moving image or voice data stored in the manual storage section 42 in relation to the manual displayed on the external display 61 is provided as directed by the navigation section 45.

Further, in a case where the external display 61 is provided with the moving image or voice data, the navigation section 45 provides the speaker 39 of the mobile phone 1 with voice data corresponding to the moving image. The mobile phone 1 can thereby guide a user who monitors the moving image and the voice to the operation necessary to perform the function. For another allowable configuration, the voice data can be provided, not limited to from the speaker 39 of the mobile phone 1, from the external output device 60.

Further, the navigation section 45 is configured to light the operation key 14 to be practically operated as guided, so as to make a user who is guided by means of the moving image and the voice more easily comprehend the operation content. Further, the navigation section 45 provides the external output device 60 through the external output controller 36 with an image such that a portion of the user's manual displayed on the external display 61 showing a currently guided procedure is indicated by blinking or being stressed.

Figure 8:
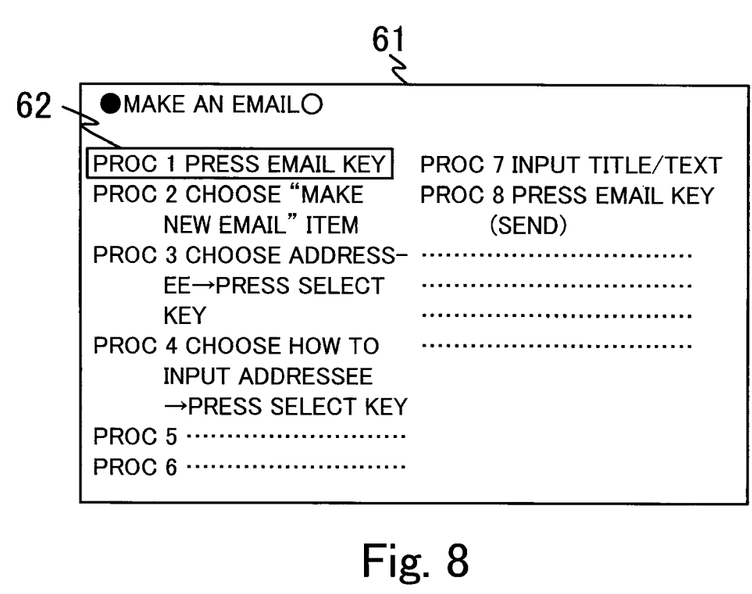
FIG. 8 shows a display example on an external display in a case where the navigation section performs the navigation process.

FIG. 8 shows an example displayed on the external display 61 in a case where the navigation section 45 carries out the navigation function. Texts of individual operation procedures of the manual displayed on the external display 61 and key operations corresponding to the operation procedures are associated with each other and are stored in the manual storage section 42.

As shown in FIG. 8, a moving image of the user's manual is displayed on the external display 61 so as to introduce a procedure for making a new email. Then, the navigation section 45 indicates an item "1. press email key" (shown in a box 62 in FIG. 8), i.e., the guided procedure, as blinking or being inverted. Further, the navigation section 45 lights the email key 18 included in the operation keys 14 that the user is prompted to press for the item "1. press email key" so as to distinguish the email key 18 from the other keys (not shown).

The navigation section 45 identifies, at a step S34, whether the navigation section 45 senses that the guided operation for the user is carried out. Upon guiding the user to the operation for pressing the email key 18 at the step S33, e.g., the navigation section 45 identifies whether the operation for pressing the email key 18 is practically sensed. Upon identifying the guided operation as not being sensed ("NO" of the step S34), the navigation section 45 waits until the operation is sensed.

Meanwhile, upon identifying the guided operation as being sensed ("YES" of the step S34), the navigation section 45 notifies the user, at a step S35, that the guided operation for the user has finished. To put it specifically, the navigation section 45 notifies the user that the operation has finished by means of notifying means such as vibration of a vibrator provided to the mobile phone 1, luminescence of an LED or an alarm sound.

The navigation section 45 identifies, at a step S36, whether all necessary operations for carrying out a certain function have finished in accordance with a procedure shown in the user's manual. Upon identifying that all the necessary procedures have not finished ("NO" of the step S36), the navigation section 45 returns to the navigation carrying out step S33, and repeats the process from the navigation carrying out step S33 to the finish identifying step S36 until all the procedures finish.

Meanwhile, upon identifying that all the procedures have finished ("YES" of the step S36), the navigation section 45 saves the present operation information on the main display 23 in the memory section 41 at a step S37.

Incidentally, the process can move from the finish identifying step S36 to the operation information saving step S37 in a case where an input of directions for finishing the navigation function is received through the navigation directions input 54, as well as in the case where all the procedures are identified as having finished at the step S36.

The navigation section 45 changes the object to be operated, at a step S38, so as to receive an operation entered by means of the operation keys 14, etc. as an operation on the external display 61 on which the user's manual is displayed. Then, the process moves again to the operation change identifying step S8 shown in FIG. 4, and the following process is carried out.

According to the embodiment, the mobile phone 1 can present a necessary operation for carrying out a function desired by a user as easily viewed by displaying the user's manual on the external display 61.

Further, not only as the mobile phone 1 displays the user's manual on the external display 61 but also as the mobile phone 1 is provided with the navigation function for guiding a user through a necessary procedure by using a moving image or voice on the basis of the user's manual, the mobile phone 1 can make the user more easily comprehend the operation procedure. Moreover, as the mobile phone 1 introduces an operation by using the user's manual and by being associated with a user's input into the mobile phone 1 at the same time, the mobile phone 1 can allow the user an intuitive operation.

According to the example shown above for guiding a user through an operation as carrying out the navigation function, the mobile phone 1 performs the processes concerning a moving image, voice, luminescence of the respective operation keys 14, etc., notification of an introduced portion of the user's manual displayed on the external display 61, etc. The mobile phone 1 does not need to perform all the above processes and can carry out the navigation function by performing at least one of the processes.

Incidentally, the present invention can be applied to a PDA (Personal Digital Assistant), a personal computer, a portable game machine, a portable music player, a portable moving image player and other mobile terminals as well as to the mobile phone 1.

Further, a series of the processes described above as to the embodiment of the present invention can be implemented by hardware as well as by software.

According to the example shown above of the embodiment of the present invention, the steps shown in the flowcharts are processed in chronological order as described. These steps do not need to be processed chronologically, and can include processes performed in parallel or separately.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:
1. A mobile communication terminal adapted for being connected to an external display device through a wired or wireless link, comprising:
an input section which receives an input for operating the mobile communication terminal;

a storage section which stores a manual of the mobile communication terminal, the manual including a procedure for an operation performed through the input section;

an external output controller which provides the external display device with the manual so as to display the manual on the external display device; and a navigation section which introduces a series of operations to be input through the input section in accordance with the procedure displayed on the external display device, wherein the navigation section is configured to display a moving image of the manual on the external display device, such that a portion of the manual displayed on the external display device showing a currently guided procedure is indicated by blinking or being inverted.

2. The mobile communication terminal according to claim 1, wherein the navigation section introduces one of the operations upon sensing the previous one of the operations as having been input through the input section.

3. The mobile communication terminal according to claim 1, wherein the navigation section introduces the operations by providing voice corresponding to the procedure displayed on the external display device.

4. The mobile communication terminal according to claim 1, wherein the navigation section introduces the operations by presenting the manual on a moving image.

5. The mobile communication terminal according to claim 1, wherein the input section includes a plurality of operation keys which can individually emit light and the navigation section introduces the operations by making one of the operation keys to be operated emit light.

6. The mobile communication terminal according to claim 1, further comprising:

a display section which displays a screen to be operated through the input section; and an operation changing section which changes an object to be operated from the manual displayed on the external display device to the screen displayed on the display section or vice versa.

7. A method for navigating a series of operations of a mobile communication terminal adapted for being connected to an external display device through a wired or wireless link, comprising:

receiving an input for operating the mobile communication terminal;

providing the external display device with a manual of the mobile communication terminal stored in the mobile communication terminal so as to display the manual on the external display device; and introducing a series of operations to be input through the input section in accordance with the procedure displayed on the external display device, wherein the introducing step includes displaying a moving image of the manual on the external display device, such that a portion of the manual displayed on the external display device showing a currently guided procedure is indicated by blinking or being inverted.

8. The method for navigating the series of operations of the mobile communication terminal according to claim 7, wherein one of the operations is introduced upon the previous one of the operations being sensed as having been input through the input section.

9. The method for navigating the series of operations of the mobile communication terminal according to claim 7, wherein the operations are introduced by means of voice corresponding to the procedure displayed on the external display device.

10. The method for navigating the series of operations of the mobile communication terminal according to claim 7, wherein the operations are introduced by means of the manual presented on a moving image.

11. The method for navigating the series of operations of the mobile communication terminal according to claim 7, wherein the operations are introduced by means of a plurality of operation keys of the mobile communication terminal which can individually emit light, one of the operation keys to be operated being made emit light.

12. The method for navigating the series of operations of the mobile communication terminal according to claim 7, further comprising changing an object to be operated from the manual displayed on the external display device to a screen displayed on a display section of the mobile communication terminal or vice versa.

* * * * *